Figure 1:
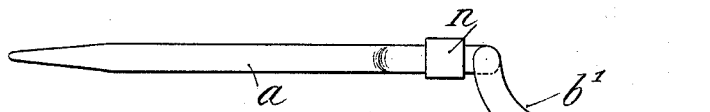

No. 756,515. PATENTED APR. 5, 1904.
E. MICHELIN.
LEVER FOR MANIPULATING THE COVERS OF PNEUMATIC TIRES.
APPLICATION FILED JAN. 12, 1904.
NO MODEL.

Witnesses:-
Fred'k Haynes
F. George Barry.

Inventor:-
Edouard Michelin
By attorneys

No. 756,515.                                              Patented April 5, 1904.

UNITED STATES PATENT OFFICE.

EDOUARD MICHELIN, OF CLERMONT-FERRAND, FRANCE.

LEVER FOR MANIPULATING THE COVERS OF PNEUMATIC TIRES.

SPECIFICATION forming part of Letters Patent No. 756,515, dated April 5, 1904.

Application filed January 12, 1904. Serial No. 188,715. (No model.)

*To all whom it may concern:*

Be it known that I, EDOUARD MICHELIN, manufacturer, a citizen of the Republic of France, and a resident of Clermont-Ferrand, Puy-de-Dôme, France, have invented a new and useful Lever for Manipulating the Covers of Pneumatic Tires, of which the following is a specification.

This invention relates to that description of covers for pneumatic tires whose thickened hook-shaped edges are engaged with the hook-shaped edges of the wheel-rim. In order to prevent the accidental disengagement of the said thickened edges of the cover, which formerly frequently occurred during the running, safety screw-bolts are employed that are passed through holes in the wheel-rim and have angular-shaped heads that when the bolt is secured in position by an external screw-nut presses against the thickened edges of the cover in such manner as to secure them in the hooked edges of the rim. The safety-bolts have to be inserted after the cover has been placed on the rim with one of its edges engaged with the rim, and for facilitating the holding of the other edge of the cover to one side while the safety-bolt is being inserted a straight bar or lever has been used having notches or projections on one side with which the said loose edge of the cover is made to engage, so that on placing the lower end of the lever behind the rim on the inner surface of the fixed edge of the cover and raising the lever up the loose edge of the cover is raised up thereby, so as to allow of the insertion of the safety-bolt. As the loose edge of the cover has to be considerably expanded for this purpose, the force required to be applied to the lever is considerable, in particular in the case of large tires, and it sometimes happens that the end of the lever slips off its fulcrum, in which case the strain of the cover causes the lever to be jerked with some force toward the manipulator, frequently causing injury.

The present invention has for its object to obviate these inconveniences; and it consists in the construction for the above-named purpose of a lever device that greatly facilitates the moving to one side of the loose edge of the cover without straining it to any considerable extent, so that less force is required for the operation, while at the same time there is no risk of the lever slipping and a more convenient space is afforded for inserting the safety-bolts. The construction of and mode of operating with the said lever device is shown in the accompanying drawings, in which—

Figure 2:
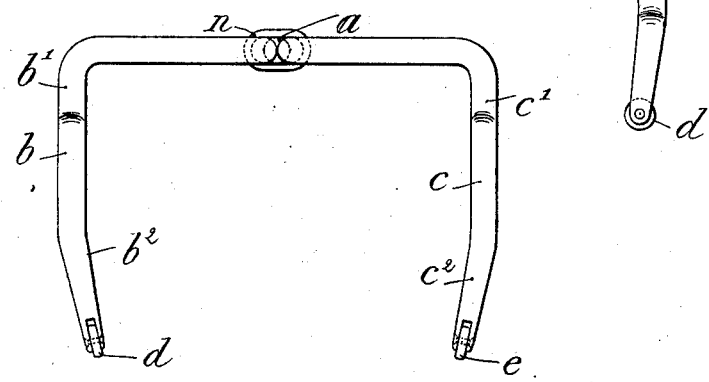
Figure 3:
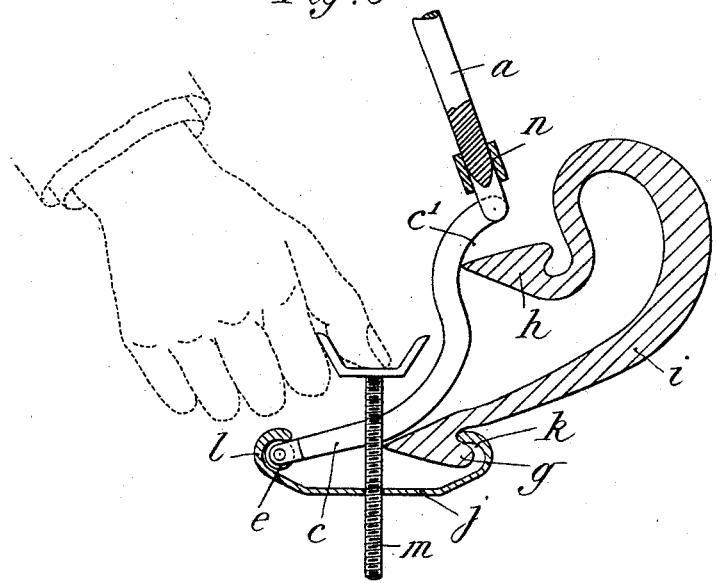

Figure 1 shows a side elevation, and Fig. 2 a front elevation, of the instrument; and Fig. 3 shows the mode of operating therewith.

The instrument is composed, first, of a lever arm or handle $a$, with chisel-shaped end, so as to serve, as in existing levers, for pushing the thickened hook-shaped edges of the cover into the hollow edges of the rim, and, secondly, of a fork-shaped part the distance between whose limbs or prongs $b$ and $c$ may vary according to the type of lever and the size of the pneumatic tire to be manipulated. It is made sufficiently large to allow of a safety-bolt or the valve-nipple of the pneumatic tube being conveniently introduced between them by the hand. Each of the limbs is provided with a small roller $d\ e$ at its end. In order to strengthen the part of the lever where it divides into the fork, a ring $n$ is preferably shrunk on at that point.

As shown at Figs. 1 and 3, the limbs $b\ c$ are bent into an S shape, the concave part $b'\ c'$ serving to receive the loose edge of the cover, while the convex part $b^2\ c^2$ is made to press upon the fixed edge, as will be presently explained.

The mode of operating with this instrument is as follows: Referring to Fig. 3, the operator being situated on the left-hand side of the wheel-rim $j$ and the hooked edge $g$ of the cover $i$ having been engaged with the hook-shaped edge $k$ of the rim, as shown, the free edge $h$ of the cover is seized with the left hand and is drawn forward, so as to enable the limbs $b\ c$ of the lever $a$ to be readily introduced underneath it into the interior of the rim and pushed inward until they bear with the rollers against the fixed edge. The free edge $h$ is then placed with its point in the concave part $b'\ c'$ of the limbs, and the lever is shifted along the rim $j$ until one of the bolt-holes in the latter is situated about midway between the two limbs $b\ c$. The outer end of the lever $a$ is then raised up from the horizontal position, thereby pushing the part of the free edge of the cover while still engaged with the hollows $b'$ $c'$ over to the right hand into the position shown at Fig. 3. As the lever is moved beyond the vertical position in this operation the lower ends of the limbs $b$ $c$, with their rollers, will leave the edge $g$ of the cover and will roll across the rim until they finally engage under the edge $l$ of the latter, which thus affords a very secure fulcrum to the lever, preventing all risk of slipping. In this position of the lever it will be seen that in addition to holding the edge $h$ of the cover, as described, it also presses with the convex parts $b^2$ $c^2$ against the edge $g$, so as to prevent this from being disengaged from the edge $k$ of the rim by the strain put upon the cover. While the lever is held in the above-described position with the left hand, the safety-bolt $m$ is readily inserted through the hole in the rim with the right hand, as shown.

It will be seen from Fig. 3 that the edge $h$ of the cover will be much less expanded and consequently strained in being brought into the position shown than is the case when it is raised up to a considerable height by means of the levers of known construction and that consequently the described operation will require much less force, in addition to which, as the lever is afforded two points of support instead of only one, as heretofore, it is more stable during the described motion. The ends $b^2$ $c^2$ of the limbs are bent slightly toward each other, as shown, in order that their position may be at right angles to the curved surface of the rim, and thus the described movement of the rollers is facilitated.

The apparatus is used in precisely the same manner for removing the safety-bolts when required, as also for inserting the valve-nipple of the pneumatic tube through its hole in the rim. In this case the cover being moved aside by the lever, as above described, and the pneumatic tube being more or less depleted of air its valve-nipple is inserted through the hole in the rim, after which, the tube being held down, so as to keep the nipple in position, the limbs $b$ $c$ are drawn laterally from under the tube.

Having thus described the nature of this invention and the best means I know of carrying the same into practical effect, I claim—

1. A lever device for manipulating the covers of pneumatic tires for the insertion or removal either of safety-bolts or of the valve-nipples of the pneumatic tube which lever is composed of a forked part with a straight part or handle the limbs of the forked part being bent into S shape in order to present a concave part adapted to receive the free edge of the cover and a convex part adapted to press upon the fixed edge of the cover during the said operation, while the ends of the limbs are adapted to bear upon the inner surface of the rim, substantially as described.

2. A lever device for manipulating the covers of pneumatic tires for the insertion or removal either of safety-bolts or of the valve-nipples of the pneumatic tube, which lever is composed of a forked part with a straight part or handle the limbs of the forked part being bent into S shape in order to present a concave part adapted to receive the free edge of the cover and a convex part adapted to press upon the fixed edge of the cover during the said operation, the ends of the limbs being provided with rollers that are adapted to bear against the inner surface of the rim, and being also bent toward each other so as to be situated at right angles to the periphery of the rim, substantially as described.

In testimony that I claim the foregoing as my invention I have signed my name, in presence of two witnesses, this 29th day of December, 1903.

EDOUARD MICHELIN.

Witnesses:
   HERNANDO DE SOTO,
   ALCIDE FALS.